(12) United States Patent
Nelson et al.

(10) Patent No.: US 6,191,406 B1
(45) Date of Patent: Feb. 20, 2001

(54) DATA READER AND READER SYSTEM HAVING VISIBLE CENTERLESS TARGETING

(75) Inventors: David J. Nelson, Rochester; Robert C. Bryant, Honeoyo Falls; Carl F. Leidig, Rochester, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/122,502

(22) Filed: Jul. 24, 1998

(51) Int. Cl.[7] .................................................. G06K 9/00
(52) U.S. Cl. ...................................... 250/208.1; 250/566
(58) Field of Search .................................. 250/566, 568, 250/569, 271, 208.1, 237 G, 567, 555; 235/472.01, 462.2, 462.21, 462.44, 462.45, 454, 468, 438, 462.07, 462.22

(56) References Cited

U.S. PATENT DOCUMENTS

| | | |
|---|---|---|
| 3,416,426 | 12/1968 | Land . |
| 4,603,262 | 7/1986 | Eastman et al. . |
| 4,652,750 | 3/1987 | Eastman et al. . |
| 4,820,911 | 4/1989 | Arackellian et al. . |
| 4,914,460 | 4/1990 | Caimi et al. . |
| 4,983,817 | 1/1991 | Dolash et al. . |
| 4,983,996 | 1/1991 | Kinoshita . |
| 5,059,126 | 10/1991 | Kimball . |
| 5,142,299 | 8/1992 | Braun . |
| 5,212,371 | 5/1993 | Boles et al. . |
| 5,289,220 | 2/1994 | Fidler et al. . |
| 5,314,336 | 5/1994 | Diamond et al. . |
| 5,378,883 | 1/1995 | Batterman et al. . |
| 5,448,323 | 9/1995 | Clark et al. . |
| 5,468,949 | 11/1995 | Swartz et al. . |
| 5,486,944 | 1/1996 | Bard et al. . |
| 5,502,304 | 3/1996 | Berson et al. . |
| 5,547,501 | 8/1996 | Maruyama et al. . |
| 5,550,364 | 8/1996 | Rudeen . |
| 5,591,955 | 1/1997 | Laser et al. . |
| 5,598,007 | 1/1997 | Bunce et al. . |
| 5,627,360 | 5/1997 | Rudeen . |
| 5,644,557 | 7/1997 | Akamine et al. . |
| 5,666,557 | 9/1997 | McIntyre et al. . |
| 5,668,364 | 9/1997 | Swartz et al. . |
| 5,693,693 | 12/1997 | Auslander et al. . |
| 5,710,834 | 1/1998 | Rhoads . |
| 5,786,582 * | 7/1998 | Roustaei et al. ................ 235/462.07 |
| 5,841,121 | 11/1998 | Koenck . |
| 5,852,803 | 11/1998 | Ashby et al. . |

* cited by examiner

Primary Examiner—John R. Lee
(74) Attorney, Agent, or Firm—Robert Luke Walker

(57) ABSTRACT

A data reader has a digital image detector an optical system imaging on the digital image detector, and a marker beam source that emits a diverging, centerless visible light projection. A data reading system includes the data reader and media bearing: a visible primary image and a secondary image overlying the visible image. The secondary image is transparent to visible radiation and modulates a band of invisible electromagnetic radiation. The media also bears visible indicia aligned with the secondary image.

32 Claims, 7 Drawing Sheets

DATA READER AND READER SYSTEM HAVING VISIBLE CENTERLESS TARGETING

CROSS REFERENCE TO RELATED APPLICATIONS

Reference is made to commonly assigned U.S. patent applications Ser. No. 09/121,907, entitled: ANGLED TARGETING DATA READER AND READING SYSTEM, and filed in the names of Carl F. Leidig, David J. Nelson, Robert C. Bryant; Ser. No. 08/931,575, entitled: METHOD AND APPARATUS FOR PRODUCING IMAGE PRINTS WITH VARIABLE DATA ENCODEMENT, and filed in the names of Peter P. Soscia, Jeffrey Alan Small, Thomas C. Reiter, now abandoned; Ser. No. 08/959,036, entitled: SYSTEM AND PROCESS FOR NON-PERCEPTIBLY INTEGRATING SOUND DATA INTO A PRINTED IMAGE, and filed in the name of Peter P. Soscia, now U.S. Pat. No. 6,094,279.

FIELD OF THE INVENTION

The invention relates to photography and systems for reading ancillary data from printed photographic media and more particularly relates to a photograph data reader system having visible, centerless targeting.

BACKGROUND OF THE INVENTION

U.S. patent application Ser. No. 08/931,575, filed Sep. 16, 1997, which is hereby incorporated herein by reference, discloses the use of a printed invisible encodement on a photographic image to record sound information. The encodement is read by illuminating using a beam of invisible electromagnetic radiation that is subject to modulation by the encodement. The resulting encodement image is captured, decoded, and played back. The photographic image on which the encodement is printed is originally captured using a camera. The invisible radiation image is captured using a data reader that is capable of capturing only invisible images within a selected band. (The term "band" is used herein to refer to one or more contiguous or non-contiguous regions of the electromagnetic spectrum. The term "invisible" is used herein to describe material which is invisible or substantially invisible to the human eye when viewed under normal viewing conditions, that is, facing the viewer and under sunlight or normal room illumination such as incandescent lighting.) The invisible image is produced by development of a photographic emulsion layer, inkjet printing, thermal dye transfer printing or other printing method. The encodement is a two-dimensional array of encoded data.

Machine readable optical data codes are widely used. Optical data codes are in the form of one-dimensional codes, commonly referred to as "bar codes", and two-dimensional codes, sometimes referred to as "two-dimensional bar codes". Simple, manually scanned readers, such as that disclosed in U.S. Pat. No. 4,603,262, can be provided for one-dimensional codes. More complex readers are needed for two-dimensional codes. These readers are held over the code, while the reader internally scans the code or captures an instantaneous two-dimensional image.

Some optical code readers illuminate visible bar codes with a beam of invisible or "nearly invisible" radiation. It is well known with such readers to use a light projection to help in targeting optical codes. U.S. Pat. No. 4,603,262 and U.S. Pat. No. 4,652,750 teach the use of a projection to provide a spot during manual scanning with an invisible beam. U.S. Pat. No. 5,668,364 teaches a similar marker projection that is used, with a two-position switch, for targeting prior to scanning. U.S. Pat. No. 5,598,007; U.S. Pat. No. 5,627,360; and U.S. Pat. No. 5,550,364 teach readers which utilize a projection having one or more pair of converging beams. The readers are moved toward or away from an optical code until, at an appropriate focusing distance, each pair of beams converges into a single spot. The multiple pairs of beams can be used in aligning the readers and optical codes. U.S. Pat. No. 5,289,220 teaches the use of similar close focusing beams in a camera. Reader alignment using a two-dimensional spot pattern, such as a bar or line, or pair or spots, or scanned spot; are also taught by: U.S. Pat. No. 4,820,911; U.S. Pat. No. 5,468,949; U.S. Pat. No. 5,212,371; U.S. Pat. No. 5,486,944. U.S. Pat. No. 5,378,883 teaches an off-center spot that is brought nearer the center. The "User's Guide" for the WelchAllyn™ Imageteam™ 4400 2D hand-held image reader, marketed by Welch Allyn, Inc., of Skaneateles Falls, N.Y., teaches the use of a reader having targeting spots in the form of a cross that is centered on the optical code. Four additional spots, in the form of inwardly facing chevrons, define outer limits of the detection area. The targeting spots are produced by use of a laser diode and diffractive optical element and are extinguished during capture of a code.

In the above references, the marker projection or beams are targeted at and impinge on the subject matter of interest, a visible bar code or other code. The illumination of the code by the marker projection makes it easy to see the code in dim conditions, but makes it difficult to clearly view the details and coloration of the code, since the illumination is uneven and generally monochromatic. This is inconsequential, however, since the code only needs to be targeted by the user, not viewed.

Laser pointers are available which use a laser diode and diffractive optical element to project a wide variety of patterns. Diffracted patterns sometimes present a rectangular outline or other array of shaped features surrounding a residual undiffracted spot from the zero order beam.

It would be desirable to provide a data reader and system for reading an invisible image under lighting conditions suitable for viewing an underlying visible image, in which a diffracted, centerless aiming projection is free from a zero order beam or beams.

SUMMARY OF THE INVENTION

The invention is defined by the claims. The invention, in its broader aspects, provides a data reader that has a digital image detector, an optical system imaging on the digital image detector, and a marker beam source that emits a diverging, centerless visible light projection and a data reading system that includes the data reader and media bearing: a visible primary image and a secondary image overlying the visible image. The secondary image is transparent to visible radiation and modulates a band of invisible electromagnetic radiation. The media also bears visible indicia aligned with the secondary image.

It is an advantageous effect of at least some of the embodiments of the invention that a data reader and system are provided for reading an invisible image under lighting conditions suitable for viewing an underlying visible image, in which a diffracted, centerless aiming projection is free from a zero order beam or beams.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
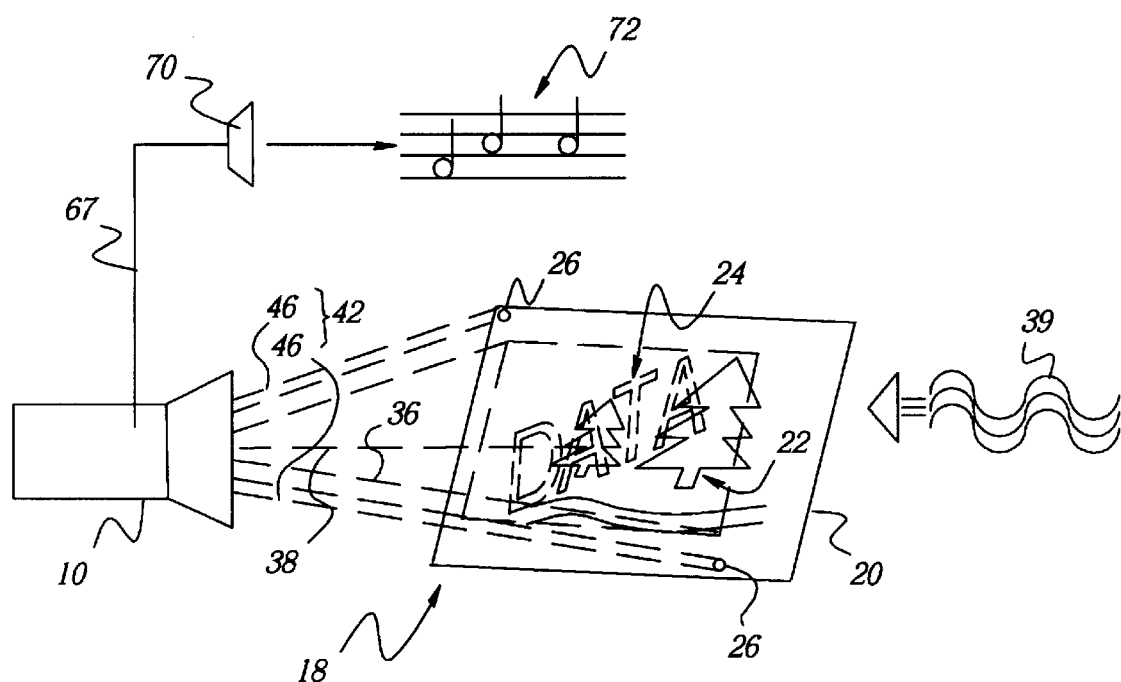
FIG. 1 is a semi-diagrammatical view of an embodiment of the system.

Referring initially to FIGS. 1–7, the data readers 10 each have a digital image detector 12 sensitive to a band of invisible electromagnetic radiation, an optical system 14 (illustrated in the drawings by a lens shape) imaging on the detector 12, and a marker projection source 16 that faces in generally the same direction as the optical system 14. The data readers 10 are preferably used in systems 18 having media 20 bearing a visible primary image 22 (illustrated in the figures as a group of trees), and a secondary image 24 (symbolized in the figures by a dashed box and the word "data") overlying the primary image 22. The secondary image 24 is invisible, that is, transparent to visible radiation; but modulates the band of invisible electromagnetic radiation to which the detector 12 is sensitive. A visible fiducial 26 is aligned with, but offset from the secondary image 24. The invention is discussed herein generally in terms of a portable data reader 10; but it will be understood that the data reader 10 need not be portable and can be in the form of a digital camera such as disclosed in U.S. patent application Ser. No. 09/097,975, filed Jun. 16, 1998, which is hereby incorporated herein by reference. FIGS. 1–7 illustrate data readers 10 used to read data invisibly imprinted on a photograph print or other hard copy media.

The primary and secondary images 22,24 are referred to generally herein as being "visible" and "invisible", respectively. The primary image 22 can reflect or emit a small percentage of invisible radiation (also referred to herein as an "invisible component"). Similarly, the secondary image 24 is preferably fully invisible under ordinary viewing conditions, but can reflect or emit a small percentage of visible radiation (also referred to herein as a "visible component"). An invisible component of the primary image 22 is inconsequential unless the component is in the same radiation band as the radiation returning from the secondary image 24. In that case, the invisible component can act as background noise and reduce the signal to noise ratio of the secondary image 24. The amplitude of the invisible component should be insufficient to measurably degrade a digital image produced from the secondary image 24 when the secondary image 24 is read. Any visible component of the secondary image 24 should, preferably, be imperceptible to the viewer under ordinary viewing conditions; but slight degradation of the image may be acceptable under some conditions.

The visible primary image 22 is printed information that is viewable by the user, in the form of pictorial information, text or other alphanumeric information, or non-alphanumeric indicia. The nature, content, and manner of preparation of the printed image is not critical. In currently preferred embodiments, the primary image 22 is the visible image on a developed photographic reflection print. The data readers 10 can also be used with media 20 that is imageless, that is, limited to an underlying substrate without information content.

The secondary image 24 is formed by radiation in a band outside the visible spectrum, as a result of reflection, transmission, or luminance from an invisible layer that overlies the visible primary image 22. The frequency range or ranges of the invisible radiation modulated by the secondary image 24 is dependent upon the characteristics of the material used for the secondary image 24. Depending upon the material, infrared radiation or ultraviolet radiation or both can be used. Infrared radiation and infrared luminescent secondary images 24 are currently preferred.

The invisible secondary image 24 can be a pictorial image or indicia, but is preferably in the form of a data encodement. The data in the secondary image 24 can include subject specific information, such as sound recorded when the picture was taken, for playback at the time of viewing the photographic print or other use. The form of the encoded data is not critical to the invention. For example, the secondary image 24 can be in accordance with Standard PDF 417 and the LS49042D Scanner System marketed by Symbol Technologies, Inc., of Holtsville, N.Y.; or the encodement scheme marketed as Paper Disk by Cobblestone Software, Inc., of Lexington, Mass. For convenience, the secondary image 24 is sometimes referred to herein as the "encodement" and the capture of the invisible secondary image 24 is sometimes referred to herein by the term, "reading" and like terms.

Figure 12:
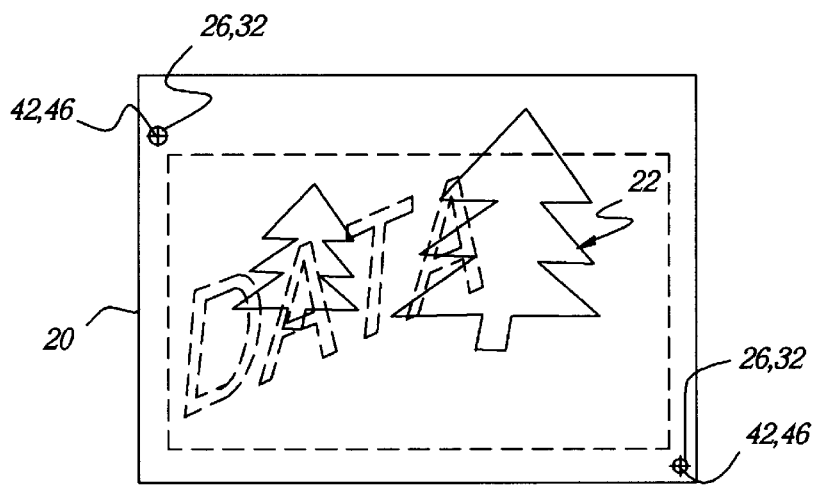
FIG. 12 is the same view as FIG. 11, but shows the projection aligned with the fiducial.
Figure 13:
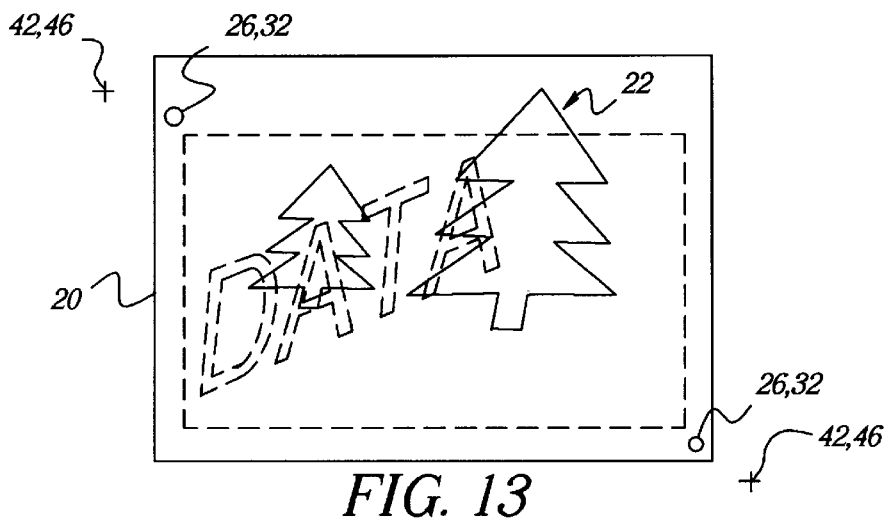
FIG. 13 is the same view as FIG. 11, but shows the projection exterior to the fiducial.
Figure 14A:
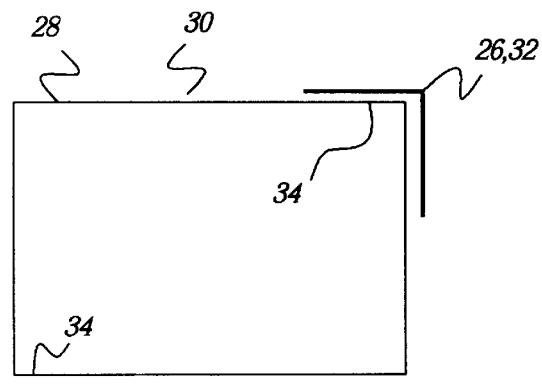
FIGS. 14a–14f are diagrammatical views of visible fiducials suitable for use in the systems. The positions of the invisible image are indicated by rectangles.
Figure 14D:
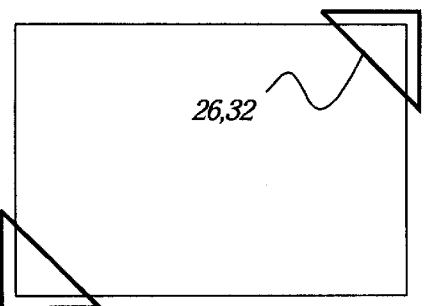
Figure 14B:
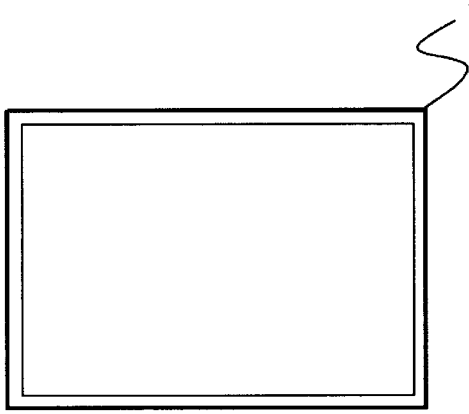
Figure 14E:
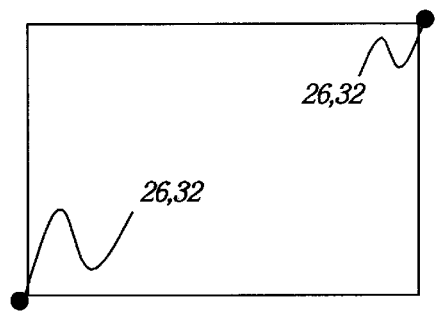
Figure 14C:
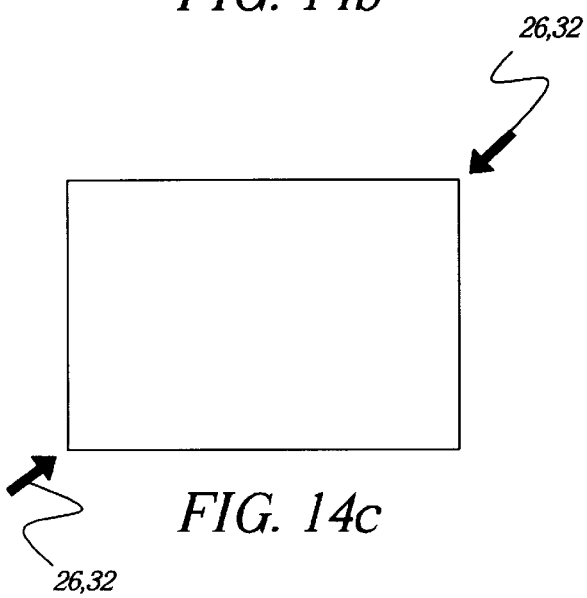
Figure 14F:
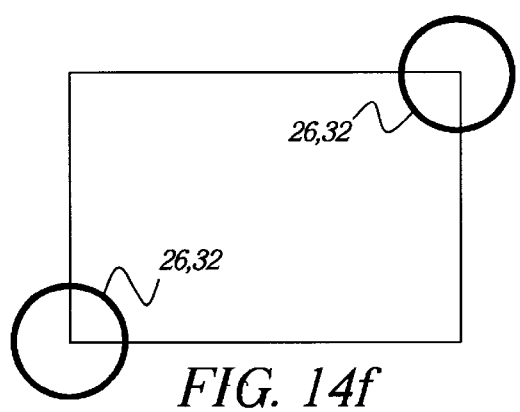

Referring particularly to FIGS. 8–13, the fiducial 26 is a visible indicia that designates a domain 28 on the media 20 that includes the secondary image 24. It is highly preferred that the fiducial 26 be exterior to the secondary image 24 and that the domain 28 include a border 30 surrounding the secondary image 24. It is also highly preferred that the fiducial 26 have two or more opposed indicators 32 defining vertices of the domain 28. For a rectangular domain 28, the indicators 32 preferably mark at least one pair of diagonally opposed corners 34. The indicators 32 can have a variety of shapes. The indicators 32 can be points or dots, as shown in FIG. 14e, but a two dimensional shape is preferred for ease of use. FIG. 14c illustrates indicators 32 shaped like a pair of inwardly pointed arrows. FIG. 14f illustrates indicators 32 shaped like circles. It is further preferred that the indicators 32 have a shape that include one or more lines, since lines make angular misalignment more obvious. FIG. 14a illustrates indicators 32 shaped like a pair of opposed, outwardly pointed chevrons. FIG. 14b adds a second pair of chevrons and connects the chevrons to provide a continuous rectangular outline. FIG. 14d has indicators 32 shaped like opposed, outwardly facing triangles.

Figure 8:
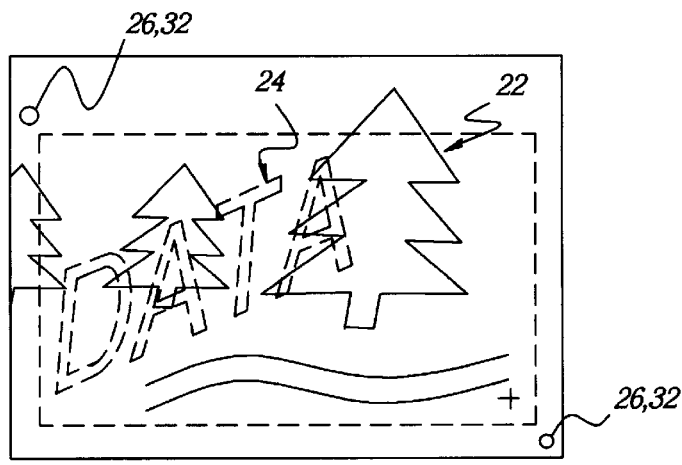
FIGS. 8–10 are semi-diagrammatical views of photographic prints suitable for use in the systems, in three different formats, each print bearing an invisible image and a fiducial.
Figure 9:
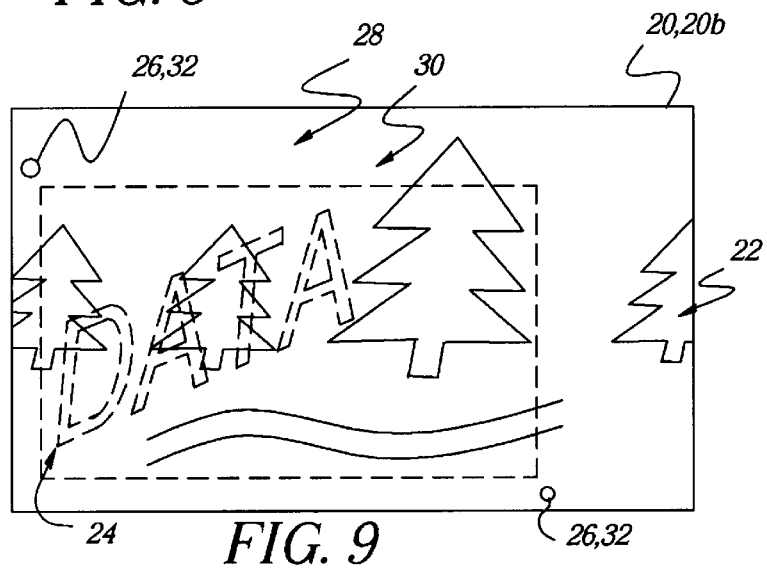
Figure 10:
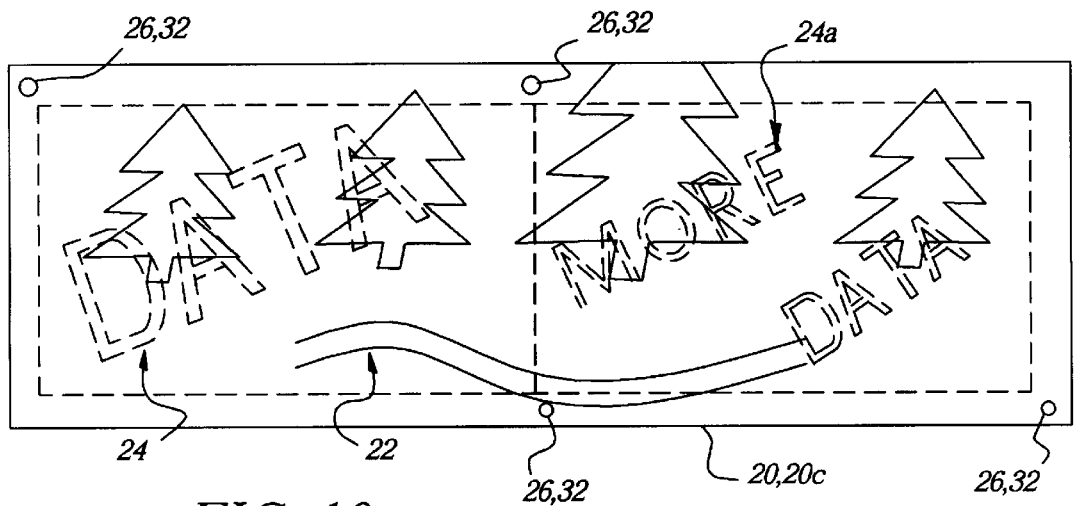

The secondary image 24 is preferably inset from the edges of the media 20, such that the border 30 of the domain 28 surrounding the secondary image 24 is wide enough to prevent losses of parts of secondary images 24 due to printing irregularities. In this case, where the primary image 22 extends to the edges of the media 20, as in a borderless photographic print, the secondary image 24 is also inset from the edges of the primary image 22. If the fiducial 26 overlies the primary image 22, it is desirable that the fiducial 26 be at the edges of the primary image 22; even if this causes the secondary image 24 to not be centered over the primary image 22. For example, as shown in FIGS. 8–10, for photographic prints available originally or as reprints in multiple formats, such as the C, H, and P formats produced in the Advanced Photo System™; it is desirable that the same secondary image 24 fit each format print 20a, 20b, 20c. As shown in FIGS. 8–10, the secondary images 24 are the same size on each print 20a, 20b, 20c and are all aligned so as to place the indicators 32 on left and bottom edges of the prints 20a, 20b, 20c. The print 20c shown in FIG. 10 is large enough to permit the placement of an additional invisible encodement 24a over the primary image 22. This additional encodement 24a can contain information supplementing the information in the secondary image 24.

The digital image detector 12 comprises one or more radiation sensitive electrical devices which convert an impinging radiation beam, that is, the radiation image of a secondary image 24 into a digital image. The term "beam", used herein, is inclusive of direction of travel, amplitude, and phase. The digital image is a signal that contains the image information of the original radiation image, within limits of system resolution, noise, and the like; and a two dimensional image can be reconstructed from the digital image as a hard copy or display in various manners well known to those of skill in the art.

The digital image detector 12 is sensitive to the modulated, invisible radiation image received from the secondary image 24. The wavelength band of this radiation is a function of the material used for the invisible secondary image. The secondary image can absorb the invisible radiation or can reflect and/or emit the invisible radiation. Depending upon the material, infrared radiation or ultraviolet radiation or both can be used. A band of infrared radiation is most convenient. Detectors 12 can be used that are sensitive to a broad band of radiation including all or most of the visible spectrum and a selected band of invisible radiation. This allows use with both visible and invisible bar codes. Filtering can be provided to limit sensitivity to a selected band, as desired. It is currently preferred to use light-sensitive electrical devices that are sensitive to a broad band of radiation including visible light and infrared radiation and to optically filter out the visible radiation. For example, widely available charge coupled devices (CCD's) are sensitive to visible radiation and a broad band of infrared radiation. The light-sensitive electrical device can also be a charge injection device, a photodiode, a CMOS imager, or another type of photoelectric transducer.

The digital image detector 12 can include one or more twodimensional light-sensitive electrical devices, or one or more two dimensional arrays of such devices, or one or more one-dimensional arrays of such devices. With one-dimensional arrays, the detector 12 includes means, well known to those of skill in the art, for scanning the incident beam to provide a two-dimensional digital image. Two-dimensional devices are preferred over one dimensional devices and the use of single discrete devices is currently preferred over the use of arrays of smaller devices for reasons of image quality and ease of assembly. An example of a suitable digital image detector 12 comprises a single CCD, such as a charge coupled device marketed by Eastman Kodak Company of Rochester, N.Y. as Model No. KAF-6300 used with an infrared bandpass filter, Model No. 54020, marketed by Oriel Corporation of Stratford, Conn. Lower resolution digital image detectors can also be used, such as a VGA (video graphics array) sensor having a resolution of 640 by 480 pixels.

The optical system 14 images on the detector 12, and with the detector 12, subtends a detector field of view (indicated by dashed lines 36 in FIGS. 1–7) centered on the optical axis 38 of the optical system 14. The size of the detector field of view varies with the distance of the object plane from the optical system 14. The nature of the optical system 14 is not critical. The optical system 14 can have a fixed or variable focal length. With a fixed focal length, the image plane is preset at the digital image detector 12, and the optical system 14 defines an optimum object distance, that is, an optimum image plane, at a preset distance from the optical system 14. It is preferred that the optical system 14 be suitable for use at 0 to about 48 inches from a secondary image 24 at the object plane to the image plane formed by the optical system 14 at the detector 12, and that the optical system 14 have an optimum or sharpest object distance in that range. For reasons of cost, it is currently preferred that the optical system 14 be fixed focus, that is, the optical system 14 has a preset focal length with an optimum object distance of from about 8–12 inches. The field of view can have a variety of shapes; but, for convenience, a field of view that is rectangular in outline is preferred. With a rectangular field of view, the optical system 14 and detector 12 subtend a horizontal angle of view along one dimension of the rectangle and a vertical angle of view along another. A maximum angle of view extends diagonally from corner to corner of the rectangle.

Figure 7:
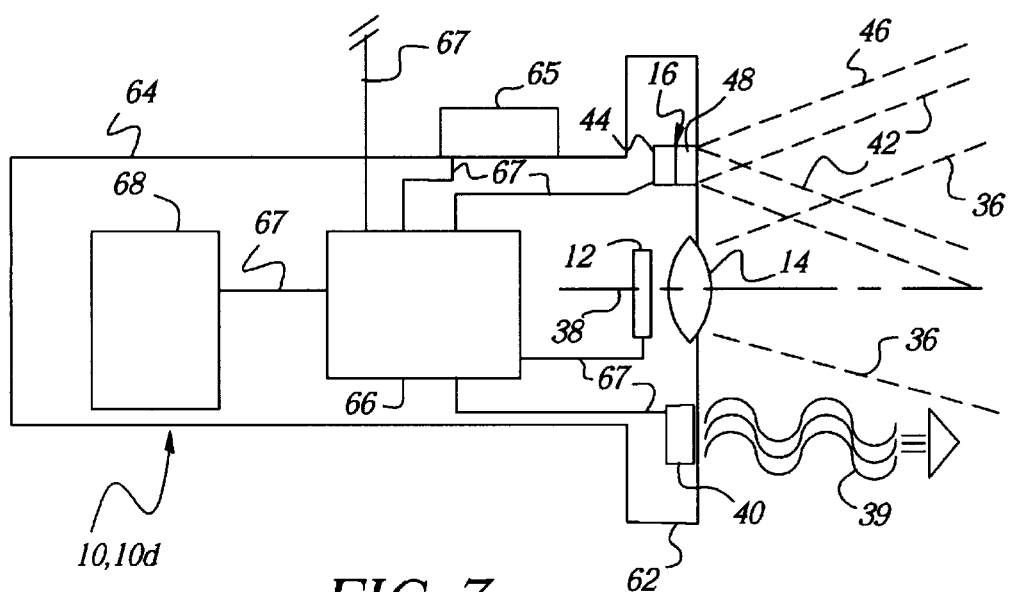
FIG. 7 is a semi-diagrammatical view of yet another data reader, which is suitable for use in a system like that of FIG. 3.

Illumination (symbolized in FIGS. 1, 3, and 7 by a wave shaped arrow 39) of the secondary image 24 can be provided to the data reader 10 by natural lighting or extraneous illumination, but it is preferred that the data reader 10 include an illuminator 40 for the secondary image 24. FIG. 7 illustrates a data reader 10 that includes an illuminator 40. The illuminator 40 can have a narrow bandwidth, selected to match the characteristics of the material used to print the secondary image 24. For example, an illuminator 40 can provide irradiation in a first infrared band to induce luminescence of the secondary image 24 in a second, lower frequency infrared band. A wide spectrum illuminator such as a flashlamp, can be used instead. Suitable illumination sources, power supplies and related features are well known to those of skill in the art. An example of a suitable illuminator 40 is a commonly available infrared emitter with a peak wavelength at 880 nm, such as Part No. MTE2050-OH1 marketed by MarkTech Optoelectronics of Latham, N.Y.

The marker projection source 16 emits a visible light projection 42 (illustrated by dashed lines in FIGS. 1–7) that can be aligned with the fiducial 26. The marker projection source 16 includes one or more emitters 44 that project a bright light that is readily seen even in the presence of ordinary room lighting. Any bright light source can be used as an emitter 44, but it is currently preferred that the emitter 44 be a coherent emitter, such as a laser diode, since current emitters produce bright, narrow beams with modest power consumption.

When the fiducial 26 and marker projection 42 are aligned, the fiducial 26 is brightly lit; but there is no other bright spot in the field of view of the optical system 14, since the zero order beam of the marker projection 42 does not form a bright spot in the field of view. This permits viewing of the visible image 22, while the data reader 10 is aligned, without the distraction of a bright spot of light at or near the center of the visible image 22. The absence of a central bright spot also offsets any tendency on the part of the user to aim the data reader at the center of the visible image 22. As FIGS. 8–10 show, with some media the secondary image 24 will not be aligned when the center of the primary image 22 is targeted. This is important, because the user may be experienced in targeting ordinary bar code readers by pointing a central spot at the center of the bar code or in the use of other similar targeting systems.

The projection 42 preferably has two or more subprojections or marker beams 46, which correspond to the indicators 32 of the fiducial 26 and collate with respective indicators 32 when the projection 42 and fiducial 26 are aligned. The marker beams 46 geometrically match respective indicators 32, that is, respective indicators 32 and marker beams 46 both have the same shape, or are related in a geometric manner that suggests a particular relative orientation or alignment, such as complementary shapes. For example, both the fiducial 26 and the projection 42 could have one of the configurations shown in FIGS. 14a–14f. Alternatively, the fiducial 26 could have one of the configurations shown in FIGS. 14a–14f and the projection 42 could have another.

The marker projection source 16 can include a pattern maker 48 on one or more emitters 44. The pattern maker or makers 48 split the beam from a respective emitter 44 into multiple component beams or mask part of the beam or both split and mask the beam or beams to produce a desired configuration. The marker projection source 16 can thus project a single marker beam 46 from each emitter 44, or by use of a pattern maker 48 that includes a beam splitter, can project a plurality of marker beams 46 from each emitter 44. For reasons of cost and convenience, a diffractive optic element is preferred for the pattern maker 48. A variety of different diffractive optical elements are widely available that can be used for this purpose. The diffractive optical elements can be transmissive or reflective devices. The transmissive devices can be surface type, with diffractive features only on the surface of a substrate; or volume type, with diffractive features throughout the volume of a substrate. Diffraction can be accomplished by the use of opaque edges (amplitude modulation) or phase discontinuities (phase modulation). Phase discontinuities have a higher theoretical efficiency. For reasons of economy, the currently preferred diffractive optical devices are transmissive, phase modulation, surface type.

The diffractive optical elements can be used, with or without additional light blocking members, to produce zero and higher order beams in a predetermined pattern or to produce zero order beams and reconstructed beams combining beams of different orders and signs. The zero order beam is the undiffracted component of the originally incident wavefront of the coherent light source. The higher orders beams; first order, second order, and so on; are products of diffraction and decrease in intensity with numerical increase in order number. The following discussion generally refers to only zero and "higher" order beams. For convenience, the term "zero order beam" is used herein to refer to both undiffracted components of beams and beams which have not been subject to diffraction. Higher order beams are generally treated as single beams, rather than beam pairs. It will be understood that individual beams can be blocked, redirected, and/or combined to produce the indicated results and that reconstructed beams can be substituted for other higher order beams, by selection of an appropriate diffractive element.

The projection 42 is emitted in close proximity to the optical system 14, preferably within about one or two centimeters or less, and is preferably concentric or substantially concentric with the optical axis 38. A larger separation could be provided, but would cause an undesirable increase in the overall size of the data reader 10. The marker beam or beams 46 of the marker projection 42 propagate in a direction or directions that diverge from the optical axis 38 of the optical system 14. The marker beams 46 preferably diverge from the optical axis 38 so as to subtend a maximum marker projection angle of view greater than the maximum detector 12 angle of view. The marker beams 46 are thus non-coincident with the field of view. Each marker beam 46 diverges from the optical axis 38 at an angle greater than one-half of the maximum detector angle of view, toward the exterior margin of the field of view.

Figure 11:
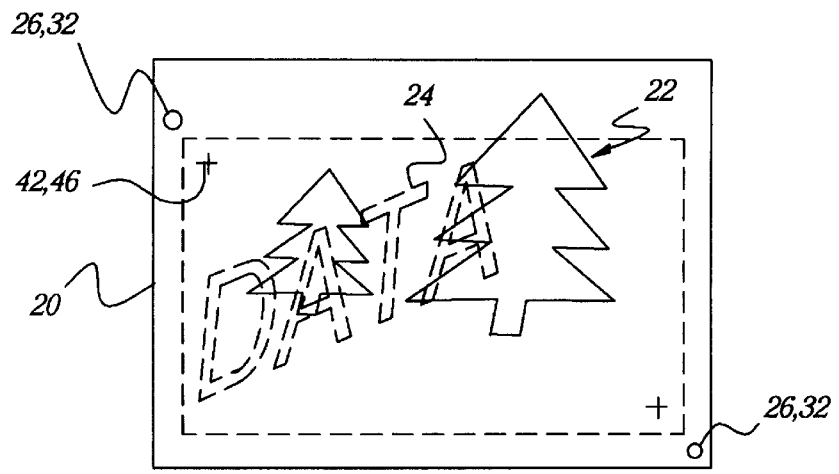
FIG. 11 is a semi-diagrammatical view of a photographic print suitable for use in the systems, showing a marker beam projection interior to a fiducial.

The marker projection 42 is positioned so as to be centered on the fiducial 26 at the optimum object distance. This permits use of encodements that are so high in capacity that the image size of the encodement on the detector 12 must always maximized, since the user can readily bring the data reader 10 to the appropriate spacing by aligning the marker projection 42 and fiducial 26. The data reader 10 is moved toward or away from the media 20 (or the media 20 is moved) until the marker projection 42 is centered on the fiducial 26, as shown in FIG. 12. When the data reader 10 is too close, the marker projection 42 is interior to the fiducial 26, as shown in FIG. 11. When the data reader 10 is too distant, the marker projection 42 is exterior to the fiducial 26, as shown in FIG. 13. As is apparent from FIGS. 11–13, it is highly desirable for this purpose that the projection 42 has a pair of opposed marker beams 46 and that the fiducial 26 has a corresponding pair of opposed indicators 32.

The data reader 10 can be used with media (not separately illustrated) bearing the primary and secondary images 22, 24, but lacking the fiducial 26. In this case, the projection 42 is aligned with edges of the media or primary image 22. This approach has the shortcoming that the detector 12 will not have the secondary images 24 centered unless the secondary images 24 are also centered on the media or primary images 22. The detector 12 will also not have the secondary images 24 maximized unless the border 30 around the secondary images 24 is narrow.

Figure 2:
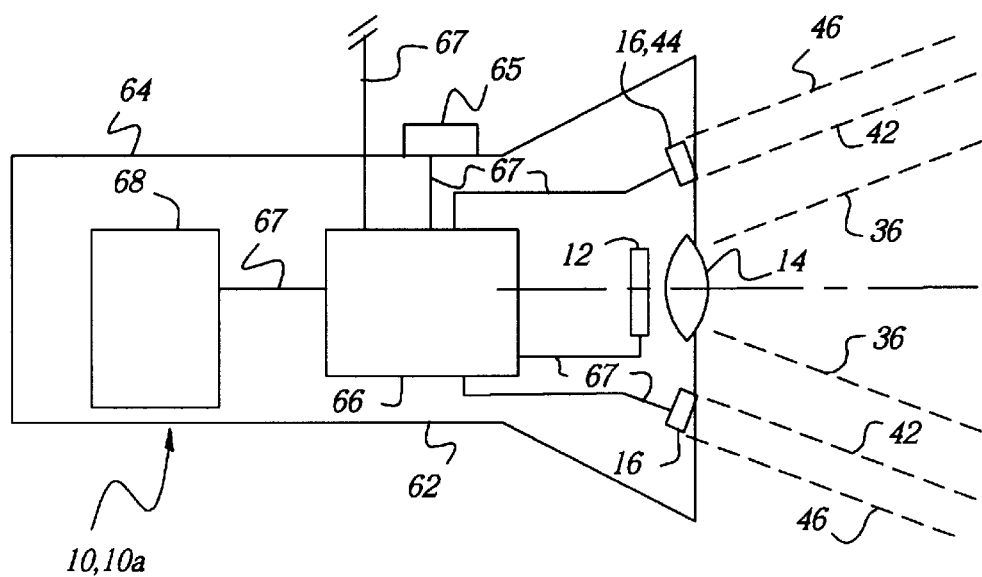
FIG. 2 is a semi-diagrammatical view of a data reader, which is suitable for use in a system like that of FIG. 1.
Figure 3:
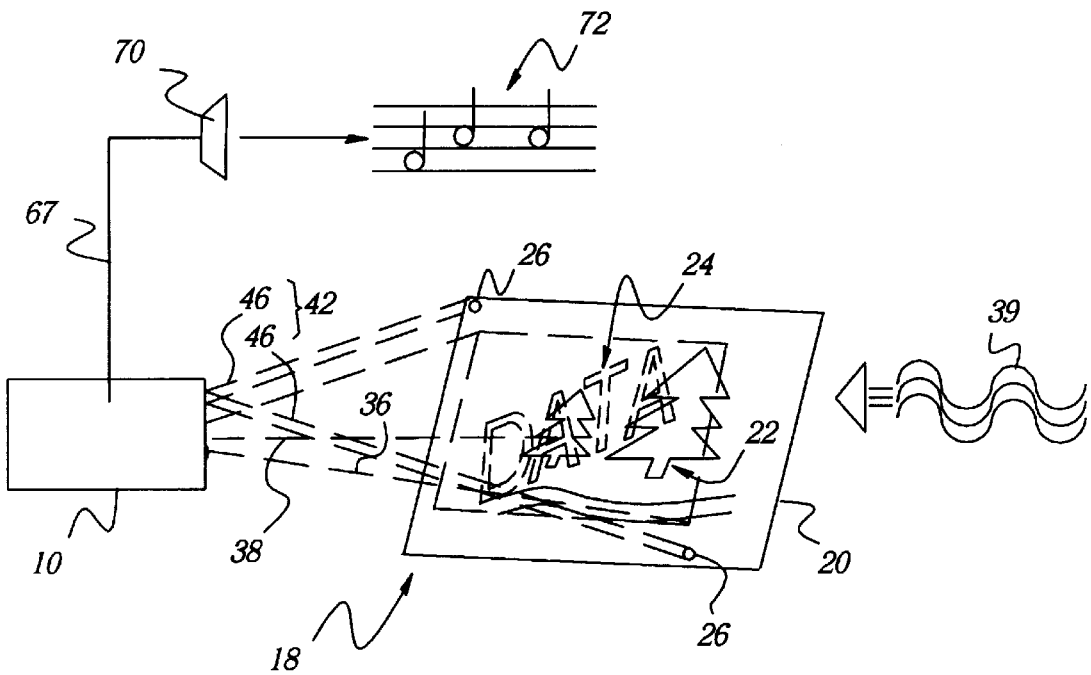
FIG. 3 is a semi-diagrammatical view of another embodiment of the system.
Figure 4:
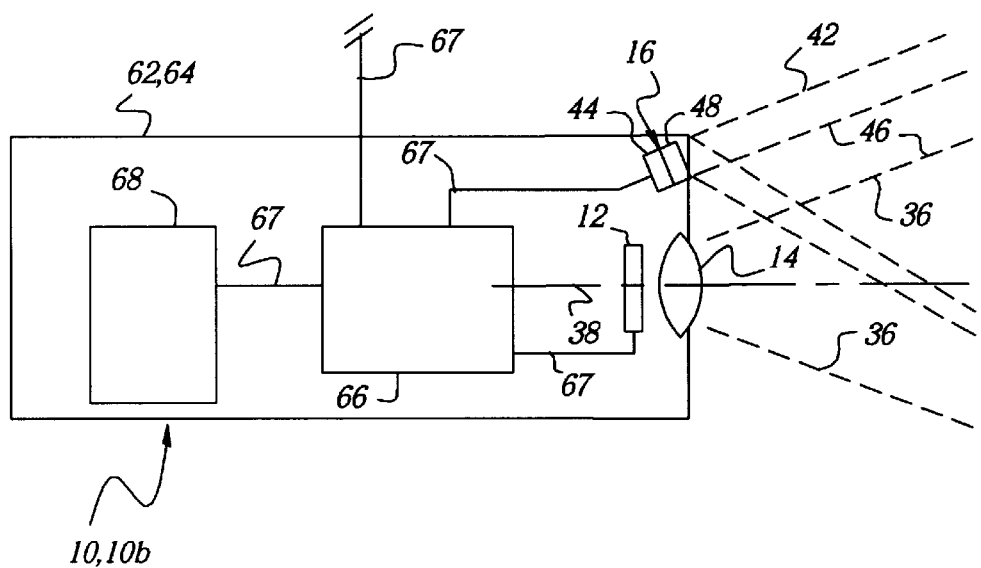
FIG. 4 is a semi-diagrammatical view of another data reader, which is suitable for use in a system like that of FIG. 3.

Referring now to the data readers 10a and 10b of FIGS. 2 and 4, the projection 42 emitted by the marker projection source 16 includes one or more zero order beams. In FIGS. 2, the projection 42 includes two marker beams 46. Each marker beam 46 is or includes a zero order beam. The marker projection source 16 of the data reader 10a has two emitters 44. Each emitter 44 is mounted in the data reader 10a so as to angle outward relative to the optical axis 38. Zero order beams produced by the emitters 44 propagate in a direction or directions that diverge outward from the optical axis 38. The zero order beam or beams do not intersect the field of view of the detector and thus do not cause a bright spot in the field of view. The angle of divergence of the zero order beams is, preferably, such that the data reader 10 is at the optimum distance from the media 20, when the projection 42 and fiducial 26 are aligned. The projection 42 may also include one or more higher order beams, which preferably also all diverge outward from the optical axis 38 and are peripheral to, that is, do not intersect, the field of view.

In the data reader 10b of FIG. 4, a single emitter is used in combination with a pattern maker 48 that splits the original beam into a zero order beam and a higher order beam. The emitter 44 is positioned in the data reader 10b such that the higher order beam diverges from the optical axis 38 opposite the zero order beam. It is convenient if the emitter 44 is positioned such that both zero order and higher order beams diverge from the optical axis 38 at opposed, equal angles. The two resulting marker beams 46 (the propagating zero order beam and higher order beam) are each, preferably, aligned with the fiducial 26 when the data reader 10 is at the optimum distance from the media 20.

Data readers 10a, 10b of FIGS. 2 and 4 are efficient and suitable for use in relatively bright ambient lighting conditions, because the zero order beams are used in the projection 42. Each emitter 44 is accurately set in a skewed position relative to the detector 12 or suitable optical components are included to provide this effect. If a diffractive optical beam splitter (discussed in detail below) is used to produce a zero order beam and higher order beam, then the marker beams 46 will differ in intensity. This effect can be mitigated by attenuating the higher order beam.

Figure 5:
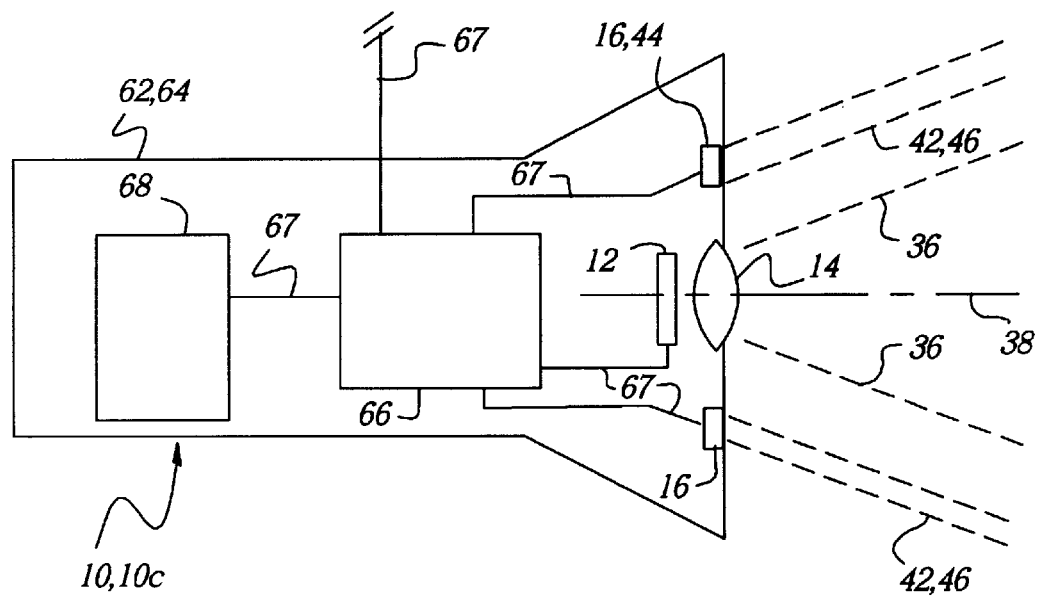
FIG. 5 is a semi-diagrammatical view of one more data reader, which is suitable for use in a system like that of FIG. 1.
Figure 6:
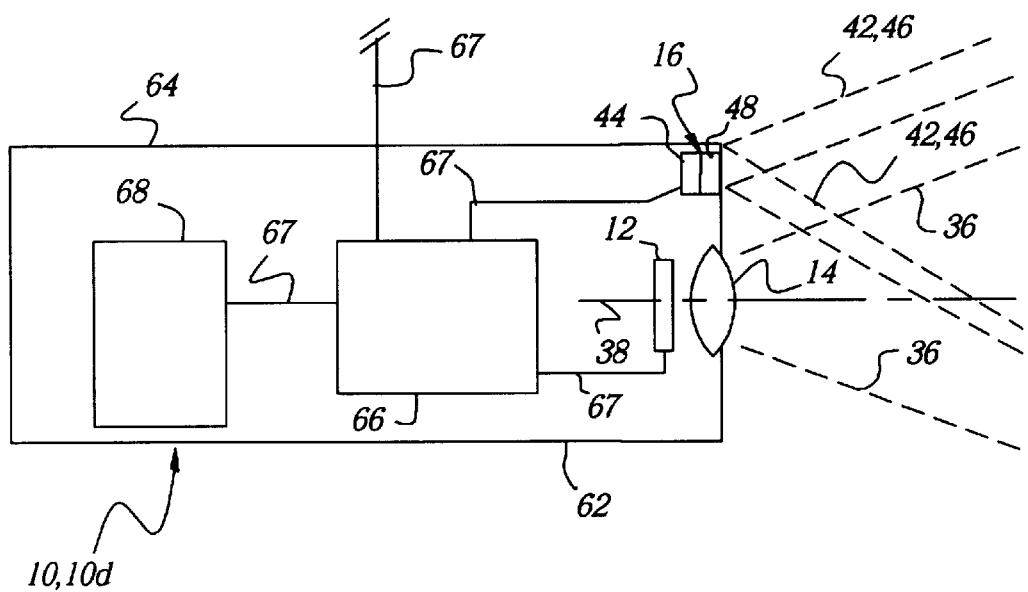
FIG. 6 is a semi-diagrammatical view of still another data reader, which is suitable for use in a system like that of FIG. 3.
Figure 15:
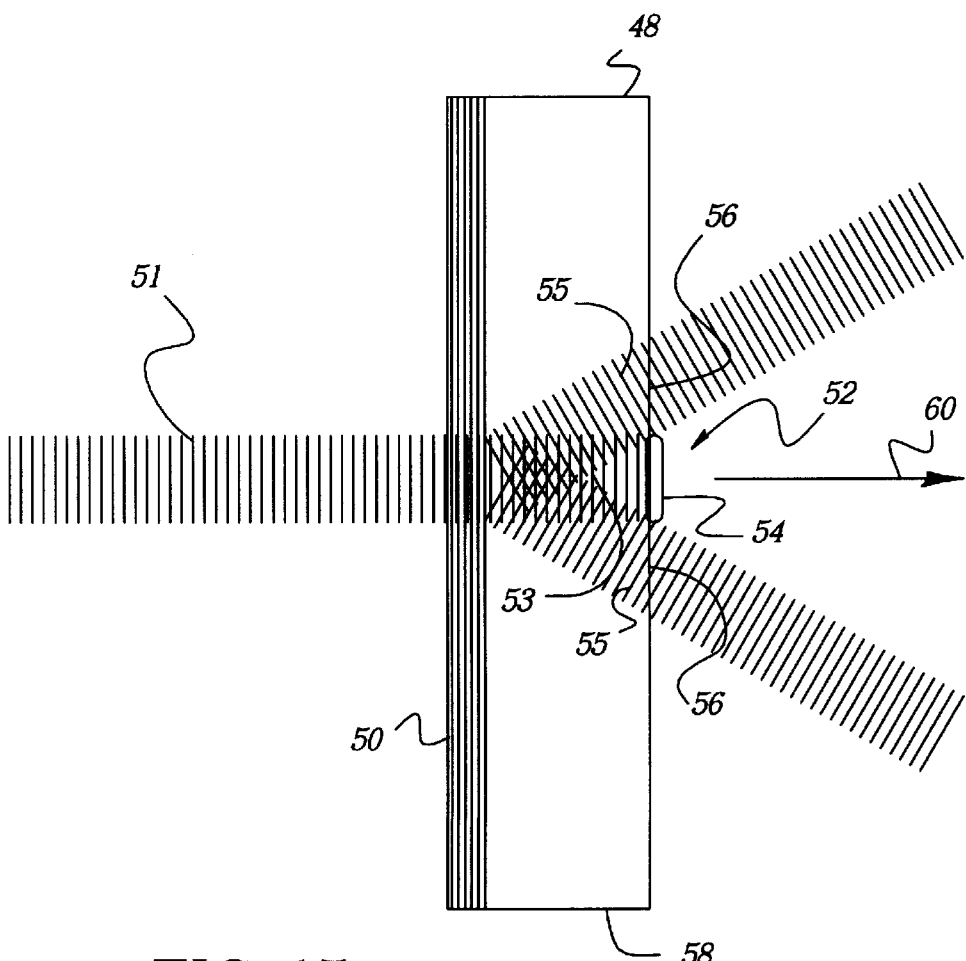
FIG. 15 is a diagrammatical view of a pattern maker suitable for use in the system of FIG. 3. The direction of propagation of the zero order beam prior to being obscured is indicated by the arrow.

Referring now to the data readers 10c and 10d of FIGS. 5–7, the projection 42 emitted by the marker projection source 16 excludes any marker beam or beams produced by zero order beams. The marker projection source 16 includes one or more light emitters 44 and pattern makers 48. Referring now to FIG. 15, each pattern maker 48 has a diffractive optical beam splitter 50 and a mask 52. The beam splitter receives light (illustrated as a sequence of parallel lines 51) from a respective light emitter 44 (not shown in FIG. 15), splits the light, and transmits a zero order beam 53 and a pair of higher order beams 55 to he mask 52. The mask 52 has a shield 54 is positioned in line with the direction (indicated in FIG. 15 by arrow 60) of propagation of the zero order beam and obstructs that beam. The zero order beam is fully blocked or is diffused to broadly illuminate domain 28. The latter is not preferred; however, because the illumination produced by the zero order beam tends to wash out the natural colors of the visible image. The mask has a window 56 that passes the higher order beam. Materials, optical properties, and other features of the mask 52 can be selected to provide the desired function.

It is highly preferred that the shield 54 is separated from the beam splitter 50 by a distance sufficient to allow the zero order and higher order beams to fully separate. For efficiency, a complete separation is preferred. In FIG. 15, the pattern maker 48 is a integral plate having the beam splitter 50 in the form of a grating ruled on an inner surface and a transparent spacer 58 separating the beam splitter 50 and shield 54. The window 56 is part of the outer surface of the spacer 58. The shield 54 is an opaque layer superimposed on another part of the outer surface. The shield 54 can be an overlay, as shown, or can be a surface effect, such as an opaque or diffusive region of a continuous layer (not shown), or can be an effect that is provided throughout a volume.

In the data readers 10c, 10d of FIGS. 5–7, zero order beams are blocked and higher order beams diverge outward from the optical axis 38 and, thus, do not intersect the field of view and cause a bright spot in the field of view. The beams are aligned with the fiducial 26 when the data reader 10 is at the optimum distance from the media 20. In FIGS. 6–7, the marker projection source 16 has one light emitter 44 and two higher order beams are emitted. In FIG. 5, the marker beam source has two emitters 44 and a total of two higher order beams.

The data readers 10a, 10b of FIGS. 2 and 4, and the data readers 10c, 10d of FIGS. 5–7 have different strengths and shortcomings.

The data readers 10c, 10d of FIGS. 5–7 are less efficient than the data readers 10a, 10b of FIGS. 2 and 4, but the emitters are simple to position during manufacture, since the emitters are simply aligned with the optical axis 38. If desired, optimum object distance can be changed by simply changing the diffractive optical element. The marker beams produced can both be the same order or can be otherwise selected to have the same intensity without attenuation.

Referring now to FIGS. 1–7, the data readers 10 each have a body 62 that supports the other components 12, 14, 16, 40. If the data reader 10 is designed for portable use, the body 62 can include a handle 64 to be gripped by the user. The data reader 10 can continuously be in an operative state; but, for extended battery life in a portable unit, preferably includes a control interface 65 (shown in FIGS. 2 and 7) that is momentarily or continuously actuated to render the data reader 10 operative. The control interface 65 can be a simple trigger or something more complex such as a voice activation unit, or the like. The trigger or other control interface 65 can have three states or positions: an unpowered state, a first powered state for energizing only the marker projection source 16, and a second powered state for energizing an illuminator 40 and the detector 12. This approach reduces the electrical load by minimizing use of the illuminator 40.

The body 62 also supports a controller 66 and, in portable units, a power supply 68 internal to the body. Lines 67 for communication and power are shown in FIGS. 1 and 3–7 connecting the controller 66, power supply 68 and other components. The controller 66 receives a signal from the detector 12 responsive to the detected image and also controls operation of the detector 12, marker projection source 16, and an included illuminator 40 responsive to the control interface. The controller 66 can use discrete components or be based on a microprocessor, as is well known to those of skill in the art.

For data reading, the user orients the data reader 10 toward the target media 20 and actuates the marker projection source 16 to generate a centerless, visible light projection 42. This is done under ordinary lighting conditions of daylight or ordinary artificial illumination or some combination of the two, which allow the user to view the visible image on the media 20 at the same time. The user next aligns the projection 42 and the visible fiducial 26 on the media 20 and maintains that alignment during reading of the secondary image 24 overlying the primary image 22. The user actuates a detector 12 and, preferably, also actuates an illuminator 40 causing the creation of a radiation image of the secondary image 24. The secondary radiation image is captured by he detector 12. Since alignment of the fiducial 26 and projection 42 is maintained, the zero order beam or beams of the projection are excluded from the secondary image 24 while it is read.

The user maintains the alignment of the fiducial 26 and projection 42 by holding the data reader 10 in a fixed position relative to the media 20. Since it is difficult to hold perfectly still, it is desirable that detector 12 be able to capture the image in a relatively short time period, comparable with the time required for an ordinary photograph. Unless a relatively long capture time is required, the projection 42 can, optionally, be deactuated during capture. This may eliminate a distraction for the user and can abate a risk of flare due to inadvertent motion of the data reader 10 during capture.

The controller 66 receives one or more signals from the control interface responsive to the actuation states. The controller 66, in response to respective actuations, actives the components, and causes the digital image detector 12 to capture an image of the field of view and to send a responsive digital image to the controller 66. The digital image can be stored in a memory unit (not separately illustrated) of the controller 66 or sent to an output unit 70 or both. The digital image can be processed by the controller 66 prior to output or storage to retrieve encoded information. The output unit 70 can store the processed digital data, or transmit the digital data in some manner to a playback device, such as a sound system or visual display device, or other output device to output all or part of the processed digital data to the user, or provide some combination of these functions, on an immediate or delayed basis. (In FIGS. 1 and 3, the data output is symbolized as an arrow and series of musical notes 72.) Components to provide any or all of these functions are well known to those of skill in the art. For example, decodement methods and components are available for the secondary image schemes previously mentioned. The separation of digital data processing from storage, transmission, and display; is a matter of logical convenience in this explanation. It will be understood that digital data processing need not be limited to a single component and processing, control, storage, transmission, and display functions can be supplied by a variety of equipment in a variety of manners. For example, digital data can be played back by a digital sound playback system through a speaker. Other audio or visual or textual information can be played back or displayed in a similar manner. The digital data can be used for control or archival purposes. Multiple uses can be made of the same unit of digital data.

The invention has been described in detail with particular reference to certain preferred embodiments thereof, but it will be understood that variations and modifications can be effected within the spirit and scope of the invention.

What is claimed is:

1. A data reader comprising:
   a digital image detector;
   an optical system imaging on said digital image detector;
   a light emitter emitting a light beam;
   a pattern maker receiving said beam from said light emitter and transmitting a zero order beam and a second beam; and
   a mask receiving said beams from said pattern maker, said mask having a shield obstructing said zero order beam and a window passing said second beam.

2. The data reader of claim 1 wherein said optical system has a preset focal length and a preset image distance from said digital image detector, said optical system defines an optimum object distance from said optical system, said optical system and said detector together define an image field; and said beams are non-coincident with said image field at said optimum object distance.

3. The data reader of claim 1 further comprising a body supporting said detector, said optical system, and said marker beam source, said body having a handle.

4. The data reader of claim 3 further comprising a power supply for said detector and said marker beam source, said power supply being internal to said body.

5. The data reader of claim 1 wherein said pattern maker includes a diffractive optic beam splitter.

6. The data reader of claim 1 further comprising an illumination source for said band of invisible electromagnetic radiation.

7. A data-reading system comprising:
   media bearing:
      a visible primary image,
      a secondary image overlying said primary image, said secondary image being transparent to visible radiation, said secondary image modulating a band of invisible electromagnetic radiation to provide an invisible radiation image, and
      a visible fiducial delimiting said secondary image; and
   a data reader including:
      a digital image detector sensitive to said invisible radiation image;
      an optical system imaging on said digital image detector; and
      a marker projection source emitting a visible light projection having a geometric shape matching said fiducial.

8. The system of claim 7 wherein said projection is free of zero order beams.

9. The system of claim 7 wherein said marker beam source includes a light emitter emitting a light beam, a pattern maker receiving said beam from said light emitter and transmitting a zero order beam and a higher order beam.

10. The system of claim 9 wherein said marker beam source includes a mask receiving said beams from said pattern maker, said mask having a shield obstructing said zero order beam and a window passing said second beam.

11. The system of claim 9 wherein said pattern maker includes a diffractive optical element.

12. The system of claim 7 wherein said projection further comprises a plurality of diverging beams.

13. The system of claim 12 wherein said optical system has a preset focal length and a preset image distance from said digital image detector, said optical system defines an optimum object distance from said optical system, said optical system and said detector together define an image field; and said beams are non-coincident with said image field at said optimum object distance.

14. The system of claim 13 wherein said beams closely adjoin said image field at said optimum object distance.

15. The system of claim 12 where in said detector is rectangular in cross-section and said field of view has two pair of corners, and said beams diverge peripheral to respective said corners.

16. The system of claim 7 further comprising a body supporting said detector, said optical system, and said marker beam source, said body having a handle.

17. The system of claim 16 further comprising a power supply for said detector and said marker beam source, said power supply being internal to said body.

18. The system of claim 7 wherein said optical system has an optical axis and said projection is concentric with said optical axis at said optimum object distance.

19. The system of claim 7 wherein said projection source includes a diffractive optic beam splitter.

20. The system of claim 7 further comprising an illumination source for said band of invisible electromagnetic radiation.

21. The system of claim 20 wherein said illumination source is an infrared illuminator.

22. The system of claim 7 wherein said visible fiducial is offset from said secondary image.

23. The system of claim 7 wherein said marker projection source emits a diverging, centerless visible light projection.

24. The system of claim 7 wherein said secondary image is off-center relative to said primary image.

25. The system of claim 7 wherein said marker projection source emits a zero order beam diverging from said optical axis.

26. The system of claim 25 wherein said detector and said optical system together subtend a detector field of view, and said zero order beam is peripheral to said field of view.

27. The system of claim 26 wherein said marker projection source has a second beam diverging from said optical axis opposite said zero order beam, said second beam being peripheral to said field of view.

28. The system of claim 27 wherein said second beam is a higher order beam.

29. A data-reading system comprising:
media bearing:
  a visible primary image,
  a plurality of secondary images overlying said primary image, each said secondary image being transparent to visible radiation, each said secondary image differently modulating a band of invisible electromagnetic radiation to provide a respective invisible radiation image, and
  a plurality of visible fiducials, each said fiducial delimiting a respective said secondary image; and
a data reader including:
  a digital image detector sensitive to said invisible radiation image;
  an optical system imaging on said digital image detector; and
  a marker projection source emitting a visible light projection having a geometric shape matching each of said fiducials.

30. A data-reading system comprising:
first and second sets of photographic prints, said prints of said first set being of a first size; said prints of said second set being of a second size different than said first size, each print of said first and second sets bearing:
  a visible primary image,
  one or more secondary images overlying said primary image, each said secondary image being transparent to visible radiation, each said secondary image differently modulating a band of invisible electromagnetic radiation to provide a respective invisible radiation image, and
  a plurality of visible fiducials, each said fiducial delimiting a respective one of said secondary images;
each of said secondary images on said sets of photographic prints being of the same size; and
a data reader including:
  a digital image detector sensitive to said invisible radiation image;
  an optical system imaging on said digital image detector; and
  a marker projection source emitting a visible light projection having a geometric shape matching each of said fiducials.

31. The system of claim 30 wherein each of said prints of said second set have a pair of secondary images.

32. The system of claim 30 wherein each said print has one of said secondary images left aligned with the respective said primary image.

* * * * *